(12) United States Patent
Yuan et al.

(10) Patent No.: US 12,286,519 B2
(45) Date of Patent: Apr. 29, 2025

(54) WEAR-RESISTANT SUPER-HYDROPHOBIC COMPOSITE MATERIAL AND PREPARATION METHOD THEREOF

(71) Applicant: SOOCHOW UNIVERSITY, Suzhou (CN)

(72) Inventors: Li Yuan, Suzhou (CN); Aijuan Gu, Suzhou (CN); Guozheng Liang, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 63 days.

(21) Appl. No.: 18/012,220

(22) PCT Filed: Nov. 10, 2020

(86) PCT No.: PCT/CN2020/127922
§ 371 (c)(1),
(2) Date: Dec. 21, 2022

(87) PCT Pub. No.: WO2022/073277
PCT Pub. Date: Apr. 14, 2022

(65) Prior Publication Data
US 2023/0257541 A1 Aug. 17, 2023

(30) Foreign Application Priority Data
Oct. 8, 2020 (CN) .......................... 202011068348.6

(51) Int. Cl.
C08J 7/04 (2020.01)
B82Y 30/00 (2011.01)
C08J 7/18 (2006.01)

(52) U.S. Cl.
CPC ............... *C08J 7/042* (2013.01); *B82Y 30/00* (2013.01); *C08J 7/18* (2013.01); *B32B 2307/73* (2013.01);
(Continued)

(58) Field of Classification Search
CPC . C09D 163/00; C08J 7/042; C08J 7/18; C08J 2383/08; C08K 2201/011;
(Continued)

(56) References Cited

U.S. PATENT DOCUMENTS

2002/0161113 A1* 10/2002 Dvornic ............... C08G 83/005
525/100
2009/0011222 A1* 1/2009 Xiu ........................ C23C 24/00
427/430.1
(Continued)

FOREIGN PATENT DOCUMENTS

| CN | 105802446 A | 7/2016 |
| CN | 106893454 A | 6/2017 |
| CN | 111019482 A | 4/2020 |

OTHER PUBLICATIONS

Translation of CN11019482A. IP.com. (Year: 2020).*
Translation of CN105802446A. IP.com (Year: 2016).*
Guo "Carbon Nanotubes Noncovalently Functionalized by an Organic-Inorganic Hybrid: New Building Blocks for Constructing Superhydrophobic Conductive Coatings." Langmuir 2010, 26, 16, 13062-13064 (Year: 2010).*
(Continued)

*Primary Examiner* — Tri V Nguyen
(74) *Attorney, Agent, or Firm* — SZDC Law PC (57) ABSTRACT

A wear-resistant super-hydrophobic composite material and a preparation method therefor are disclosed. The wear-resistant super-hydrophobic composite material includes a substrate and a wear-resistant super-hydrophobic composite material coating layer on the surface of the substrate; the wear-resistant super-hydrophobic composite material coating layer is obtained by curing a precursor for the super-hydrophobic composite material coating layer; the precursor for the super-hydrophobic composite material coating layer includes a gel and an ACNTB-SiO$_2$-coupling agent layer on the surface of the gel; the gel includes an epoxy resin and amino-terminated hyperbranched polysiloxane, or includes an epoxy resin, amino-terminated hyperbranched polysiloxane and an additive; and the additive is an ACNTB-SiO$_2$-coupling agent and/or diglycidyl-ether-terminated polydim-
(Continued)

ethylsiloxane. The wear-resistant super-hydrophobic composite material has a water contact angle higher than 160° and more than 250 rubbing cycles.

7 Claims, 4 Drawing Sheets

(52) U.S. Cl.
CPC ..... *C08J 2383/08* (2013.01); *C08K 2201/011* (2013.01)

(58) Field of Classification Search
CPC . C08K 3/36; C08K 3/041; C08K 9/02; C08K 9/04; C08L 83/09; C08L 83/08
USPC ......................................... 428/932, 447, 375
See application file for complete search history.

(56) References Cited

U.S. PATENT DOCUMENTS

2009/0085894 A1* 4/2009 Gandhi ................. G06F 3/0445
345/175
2009/0269560 A1* 10/2009 Dhinojwala ........ B81C 1/00111
428/206

OTHER PUBLICATIONS

Yi Zhang et al., "Preparation and property of epoxy resins-penetrated aligned carbon nanotube bundle hybrid microcapsules for self-healing polymers" High Performance Polymers, vol. 29, No. 4, pp. 1-13 (May 31, 20216).
Zehao Wang et al., "Mechanically durable and self-healing super-hydrophobic coating with hierarchically structured KH570 modified SiO2-decorated aligned carbon nanotube bundles" Chemical Engineering Journal 408 (2021) 127263 (Oct. 8, 2020).

* cited by examiner

WEAR-RESISTANT SUPER-HYDROPHOBIC COMPOSITE MATERIAL AND PREPARATION METHOD THEREOF

This application is the National Stage Application of PCT/CN2020/127922, filed on Nov. 10, 2020, which claims priority to Chinese Patent Application No. 202011068348.6, filed on Oct. 8, 2020, which is incorporated by reference for all purposes as if fully set forth herein.

TECHNICAL FIELD

The invention relates to a wear-resistant super-hydrophobic composite material and a preparation method thereof, in particular to a composite material coated with a super-hydrophobic composite material on a micro/nano-structured surface with excellent impact resistance, friction resistance and self-healing functions.

BACKGROUND TECHNIQUE

Materials with superhydrophobic properties have very broad application prospects in different fields such as self-cleaning, anti-icing, anti-fog, anti-corrosion, and oil-water separation. Studies have shown that by designing complex micro/nano hierarchical structures, the superhydrophobic properties of the material surface can be achieved by introducing low surface energy species. At present, hydrophobic inorganic nanoparticles ($SiO_2$, ZnO, $TiO_2$, CNT, $Al_2O_3$, graphene, etc.) are often used to construct micro/nano hierarchical surface structures to achieve the hydrophobicity of materials, but due to the weak van der Waals interaction between inorganic nanoparticles, the surface of the superhydrophobic coating exhibits fragile mechanical properties and tolerance, which seriously affects the super-hydrophobicity of the material and greatly limits the application of superhydrophobic materials in daily use. Therefore, it is a challenging task to prepare superhydrophobic coating materials with good mechanical properties and stable and wear-resistant.

In order to improve the stability of the superhydrophobic coating, the interaction between the nanoparticles and the binder can be improved by modifying the inorganic nanoparticles. At present, fluorinated alkyl chains are used to modify inorganic nanoparticles, but fluorine-containing materials will be stored in the environment for a long time, and their potential toxicity is very harmful to the human body and the environment, and the high price of fluorine-containing materials will limit its wide use in real life. It is of significance to prepare economical and wear-resistant fluorine-free superhydrophobic coating materials. In addition, in order to obtain stable superhydrophobic materials, flexible materials such as silicone resin and thermoplastic elastomer can be added to the coating. When the coating is subjected to an external load, the flexible elastic material can avoid damage to the coating surface through compression deformation. Furthermore, combining the superhydrophobic material with self-repair function can maintain the superhydrophobic performance. At present, the self-healing behavior of superhydrophobic materials is mainly by pre-embedding fluorinated alkyl chains in the coating, which can easily move to the surface at room temperature or at high temperature, or by mechanical grinding treatment to expose superhydrophobic particles. Although the above method has a positive effect on improving and stabilizing the super-hydrophobicity of the coating, the nanoparticles are easy to agglomerate, and the interaction between the particles is still weak, which is not conducive to the stability of the coating.

Based on the above analysis, in view of the current problems and development trends in the development of superhydrophobic coating materials, improving the interaction between coating components and combining the coating with self-healing function are important for the construction of wear-resistant and environmentally friendly superhydrophobic materials with stable structures and expansion. Its application has positive significance.

SUMMARY OF INVENTION

Technical Problem

Aiming at the problem of poor durability of the super-hydrophobic coating caused by the weak interaction between the existing inorganic particles and the particle/binder interface, the present invention combines and hybridizes a multi-level nano-particle with a stable structure with strong interaction between the particles. The micron-sized particles are combined with an epoxy system adhesive to prepare a composite superhydrophobic coating with a micro/nano-scale surface structure. The super-hydrophobic coating disclosed in the invention has the characteristics of simple operation, durability and good hydrophobicity, and the prepared coating has excellent mechanical properties and wear resistance. In particular, the hydrophobic nano-$SiO_2$ particles of the present invention are stored in the pores of ACNTB. When the coating structure is destroyed, the adhesive is decomposed by pyrolysis, and the formed gas products can promote the migration of $SiO_2$ to the coating surface, and build up with the bare CNTs. New nanostructured surface that restores the superhydrophobic properties of the coating.

PROBLEM SOLUTIONS

Technical Solutions

In order to achieve the above purpose, the technical solution adopted in the present invention includes: a wear-resistant super-hydrophobic composite material, which includes a substrate and a wear-resistant super-hydrophobic composite material coating on the surface of the substrate; the wear-resistant super-hydrophobic composite material coating includes a super-hydrophobic composite material. The hydrophobic composite material coating is obtained by curing with a precursor; the superhydrophobic composite material coating precursor includes a gel and an ACNTB-$SiO_2$-coupling agent layer on the surface of the gel, the gel includes an epoxy resin, an amino-terminated hyperbranched polysiloxane, or the gel includes an epoxy resin, an amino-terminated hyperbranched polysiloxane, and an additive; the additive is an ACNTB-$SiO_2$-coupling agent and/or a diglycidyl ether-terminated polydimethylsiloxane.

The method of preparing the above-mentioned wear-resistant super-hydrophobic composite material includes the following steps: coating a mixture of an ACNTB-$SiO_2$-coupling agent, an epoxy resin, a diglycidyl ether-terminated polydimethylsiloxane, and an amino-terminated hyperbranched polysiloxane on a surface of a substrate, and after gelation coating with an ACNTB-$SiO_2$-coupling agent suspension, and then curing to obtain the wear-resistant super-hydrophobic composite material; or coating a mixture of the epoxy resin, an amino-terminated hyperbranched polysiloxane mixture on the surface of the substrate, and after gelation coating with the ACNTB-SiO$_2$-coupling agent suspension, and curing to obtain the wear-resistant superhydrophobic composite material; or coating a mixture of the epoxy resin, the diglycidyl ether-terminated polydimethylsiloxane and the amino-terminated hyperbranched polysiloxane on the surface of the substrate, and coating with ACNTB-SiO$_2$-coupling agent suspension after gelation, and then cured to obtain a wear-resistant super-hydrophobic composite material; or coating a mixture of the ACNTB-SiO$_2$-coupling agent, epoxy resin, and amino-terminated hyperbranched polysiloxane on the surface of the substrate, and after gelation coating with the ACNTB-SiO$_2$-coupling agent suspension, and curing to obtain the wear-resistant superhydrophobic composite material.

In the present invention, after the aligned carbon nanotube bundles, alkali, solvent and tetraethyl orthosilicate are mixed and reacted, a silane coupling agent is added, and the reaction is continued to obtain ACNTB-SiO$_2$-coupling agent.

Preferably, a weight ratio of the aligned carbon nanotube bundles, tetraethyl orthosilicate, the silane coupling agent, the alkali, and the solvent is (1-2):(9-14):(2-5):(9-12):(100-200); the aligned carbon nanotube bundles (ACNTB) have a bundle diameter of 10-25 μm and a length of 30-100 μm, with abundant pore structure; all CNTs are oriented in a certain direction and there is obvious physical entanglement between the CNTs; the silane coupling agent is γ-methacryloyloxypropyltrimethoxysilane, hexamethylsilazane, dodecyltrimethoxysilane, vinyltrimethoxysilane, phenyltrimethoxysilane or hexadecyltrimethoxysilane; the alkali is ammonia water or triethanolamine; the solvent is water, ethanol, ethyl acetate or a mixture thereof. The method of preparing ACNTB-SiO$_2$-coupling agent is as follows: adding ACNTB particles into an alkali solvent at room temperature, stirring, adding a mixed solution of TEOS and a solvent, reacting at 30-60° C. for 18-36 h, then adding a silane coupling agent, continuing to stir for 6 h to end the reaction, cooling to room temperature naturally, washing the obtained suspension with ethanol 2-5 times, centrifuging three times, and then drying in a vacuum oven at 60° C. for 12 h to obtain black micron-sized ACNTB-coupling agent modified SiO$_2$ nano-hybrid particles (ACNTB-SiO$_2$-coupling agent), in which SiO$_2$ is assembled in the pore structure of ACNTB and on the surface of CNTs.

In the present invention, in the mixture, the weight parts of ACNTB-SiO$_2$-coupling agent, epoxy resin, diglycidyl ether-terminated polydimethylsiloxane, and amino-terminated hyperbranched polysiloxane are 0-1 part by weight, 70-100 parts, 0-70 parts, and 30-60 parts, respectively. The amount of ACNTB-SiO$_2$-coupling agent can be 0 or not 0; the amount of diglycidyl ether-terminated polydimethylsiloxane can be 0 or not 0. In the suspension, the weight part of the ACNTB-SiO$_2$-coupling agent is 4.0-20 parts. In the present invention, the total amount of ACNTB-SiO$_2$-coupling agent is 4.0-20 parts, including the ACNTB-SiO$_2$-coupling agent that may be added in the gel system and the amount of ACNTB-SiO$_2$-coupling agent in the suspension.

In the present invention, the curing process is at (50-70° C.)/1 h+(80-150° C.)/1-2 h.

In the present invention, the substrate is a conventional substrate material, such as a metal substrate, a plastic substrate, and an inorganic material substrate.

The invention discloses the application of the above-mentioned wear-resistant super-hydrophobic composite material in the preparation of wear-resistant and hydrophobic materials; the wear-resistant and hydrophobic material has a multi-level micro/nano structure surface, and has super-hydrophobicity and wear resistance.

The method of preparing the wear-resistant super-hydrophobic composite material coating of the present invention is as follows: mixing an epoxy resin, ACNTB-SiO$_2$-coupling agent (0-1 part), DGETPDMS and HBPSi evenly at 30-150° C., and maintaining for 10-20 min, obtaining a resin adhesive prepolymer gel; when the prepolymer reaches a gel state, then applying a toluene suspension containing ACNTB-SiO$_2$-coupling agent on the surface of the gel, and after the solvent volatilizes, curing at (50-70° C.)/1 h+(80-150° C.)/1-2 h to obtain wear-resistant superhydrophobic epoxy/ACNTB-SiO$_2$-coupling agent composite coating on micro/nanostructured surface. The weight ratio of ACNTB-SiO$_2$-coupling agent:toluene is 1:(25-50).

In the above technical solution, the ACNTB-SiO$_2$-coupling agent particles have a stable structure, and the SiO$_2$ nanoparticles assembled in the pores of the micron-scale ACNTB particles can effectively transfer the load borne by the CNTs in the ACNTB and limit the relative slippage of the CNTs. On the other hand, because the SiO$_2$ nanoparticles are assembled in the pore structure in ACNTB, the SiO$_2$ nanoparticles are immobilized by the CNTs. The relationship between CNT and SiO$_2$ particles in the micron-sized ACNTB-SiO$_2$-coupling agent particles is confined and restricted, so that the interaction between CNT and SiO$_2$ is enhanced and the micron-sized ACNTB-SiO$_2$-coupling agent particles have a stable structure.

In the above technical scheme, the epoxy resin is: bisphenol A epoxy resin, bisphenol F type epoxy resin, bisphenol S type epoxy resin, hydrogenated bisphenol A type epoxy resin, phenolic epoxy resin, multifunctional epoxy resin Glycidyl ether resin, glycidyl ester type epoxy resin, orhalogen epoxy resin. Diglycidyl ether-terminated polydimethylsiloxane (DGETPDMS) is a colorless and transparent liquid with a viscosity (25° C.) of 50-10000 mPa·s and a density (25° C.) of 1.05-1.10.

In the above technical solution, an amine value of the amino-terminated hyperbranched polysiloxane HBPSi is 0.5-0.65 mol/100 g, such as 0.59 mol/100 g; ethoxysilane (KH550), deionized water and absolute ethanol are mixed, stirred under nitrogen protection for 4 h, the reaction system is cooled to room temperature to obtain a transparent liquid, and the reaction system is decompressed using a vacuum decompression device to obtain HBPSi, which has an amine value of 0.59 mol/100 g, and a weight ratio of KH550, deionized water, and absolute ethanol is 22:100:16.

The super-hydrophobic coating prepared by the invention has a multi-level micro/nano structure surface, which is similar to the surface structure of lotus leaves. The water contact angle (CA) of the surface of the superhydrophobic coating can reach 155-168°, and the sliding angle is less than 5°. In particular, the superhydrophobic coating has excellent anti-friction performance and mechanical properties. After the coating is worn for nearly 300 cycles by 800-grit sandpaper under a load of 100 g (the friction stroke of one cycle is 10 cm) and the impact of water pressure of 1188 KPa for 120 s, the super-hydrophobicity is maintained. Because of the existence of ACNTB-SiO$_2$-coupling agent particles, the damaged coating can be partially decomposed by appropriate high-temperature treatment, and nano-SiO$_2$ can easily migrate to the coating surface under the action of heat and the airflow of the decomposition products, which can form new structures with CNTs. The nanostructured surface can restore the superhydrophobic properties of the coating.

Aligned carbon nanotube bundles (ACNTB) are aggregates formed by many CNTs arranged in a certain direction through the action of van der Waals force and a certain physical entanglement between carbon tubes (the bundle diameter is generally micron-scale). It is relatively long and physically entangled carbon nanotubes are not easy to dissociate, but ACNTB has a rich pore structure, which makes the ACNTB structure unstable. Under the action of external force, the CNTs in ACNTB are prone to slip, and the interaction between CNTs is poor and cannot effectively bear load. In the present invention, ACNTB particles are added to an alkali solvent at room temperature, a mixed solution of TEOS and a solvent is added after stirring, a silane coupling agent is added to the reaction mixture, the reaction is terminated after continuous stirring, and the suspension is naturally cooled to room temperature, and the obtained suspension is washed with ethanol, centrifuged and dried to obtain black micron-scale ACNTB-coupling agent-modified $SiO_2$ nano-hybrid particles (ACNTB-$SiO_2$-coupling agent), in which $SiO_2$ is assembled in the pore structure of ACNTB and on the surface of CNTs. This can strengthen the inter-CNT interaction. It can effectively transfer the force between CNT tubes and increase the structural stability of ACNTB. As a hydrophobic particle, $SiO_2$ is easily obtained by hydrolysis and modification of tetramethylsilane (TEOS). The rich pore structure of ACNTB provides sufficient conditions for preparing and storing the superhydrophobic $SiO_2$ particles. The storage of $SiO_2$ particles in the pores of ACNTB can not only improve the interaction between CNTs in ACNTB and enhance the structural stability of ACNTB, but also help maintain or improve the super-hydrophobicity of ACNTB.

Beneficial Effect

Because of the application of the above technical solutions, the present invention has the following advantages compared with the prior art: the superhydrophobic coating prepared by the present invention has outstanding impact resistance and is suitable for most substrate materials, and the coating preparation process is simple. $SiO_2$@ACNTB particles have obvious structural stability and strong interactions between particles. The composite coating thus formed has outstanding durability and super-hydrophobicity stability. In addition, the damaged coating can be partially decomposed by high temperature treatment, so that $SiO_2$ can easily migrate to the coating surface under the action of heat and gas flow of decomposition products, and together with the exposed nanoparticles, a new type of nanostructured surface can be built, which can restore the coating's properties and superhydrophobic properties.

EMBODIMENTS OF THE PRESENT INVENTION

To ensure that $SiO_2$ can transfer loads efficiently, $SiO_2$ must be effectively embedded in the pores of ACNTB. In the present invention, there is a strong interaction between CNT and $SiO_2$, so that $SiO_2$ can effectively transfer the loads, thereby effectively enhancing the structural stability of ACNTB, and ensuring that the subsequently synthesized coating has stable mechanical properties and super-hydrophobicity stability. Further, the pores in ACNTB can be used as micro-reaction vessels or mold cavities, which are conducive to the infiltration of TEOS and in-situ hydrolysis to generate nano-$SiO_2$ embedded in the pores. At this time, the $SiO_2$ particles are confined in the pore structure. When the ACNTB is stressed, the $SiO_2$ can transfer the loads between CNTs and the bearing force of ACNTB particles can be improved. There is a strong interaction between the nanoparticles in the ACNTB-$SiO_2$ system, that is, the ACNTB-$SiO_2$ system particles with a stable structure can improve the microscopic stability of the coating. More interestingly, the ACNTB-$SiO_2$ system basically retains the high aspect ratio of the original ACNTB, which is easily oriented in the direction of the fluid driven by the gravitational field and hydrodynamics, and is constructed with a special surface structure coating. Since $SiO_2$ is embedded in the pores of ACNTB, the specific surface area of ACNTB-SiO$_2$ particles per unit volume is also much larger than that of ACNTB particles. Therefore, the interaction between ACNTB-SiO$_2$ particles and the adhesive will be enhanced, which is beneficial to the improvement of the stability of the superhydrophobic coating.

The starting materials used in the present invention are all conventional commercial products, and the specific operation methods and testing methods are all conventional conditions unless otherwise specified; the technical solutions of the present invention are further described below in conjunction with the accompanying drawings and examples.

In the examples and comparative examples, the aligned carbon nanotube bundles (ACNTB) have a bundle diameter of 10-25 μm and a length of 30-100 μm.

Synthesis Example at 60° C., 3-aminopropyltriethoxysilane (KH550), deionized water and absolute ethanol were mixed, stirred for 4 h under nitrogen protection, and then the reaction system was cooled to room temperature to obtain a transparent liquid. A vacuum decompression device was used to decompress the reaction system to remove the solvent to obtain HBPSi with an amine value of 0.59 mol/100 g. A weight ratio of KH550, deionized water, and absolute ethanol is 22:100:16.

Example 1 under stirring conditions, 1.0 g of ACNTB particles was added to the mixed solution of 9.1 g of ammonia water and 110 g of ethanol. After stirring for 10 min, a mixed solution of 9.35 g of TEOS and 40 g of ethanol was added dropwise, heated in a water bath at 60° C., and 2.5 g of KH570 was added after stirring for 18 h. After continuing to stir for 6 h, the reaction was completed, naturally cooled to room temperature. The obtained suspension was washed with ethanol and centrifuged three times to collect ACNTB-SiO$_2$-KH570 particles, and then dried in a vacuum oven at 60° C. for 12 h to obtain black ACNTB-SiO$_2$-KH570 particles.

Figure 1:
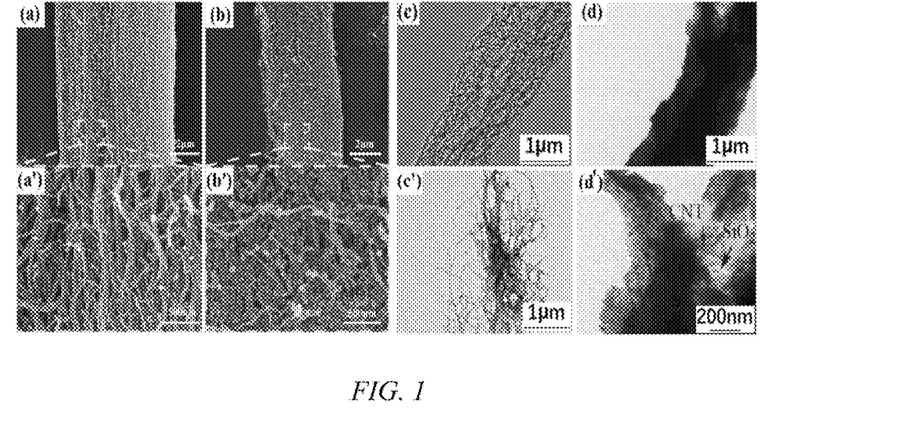
FIG. 1 shows scanning electron microscope (SEM) and transmission electron microscope (TEM) images of ACNTB and ACNTB-$SiO_2$-KH570 in Example 1, wherein (a, a', c) ACNTB without ultrasonic treatment, (c') ACNTB with ultrasonic treatment for 5 min, (b, b', d, d') ACNTB-$SiO_2$-KH570 after sonication for 5 min.
Figure 2:
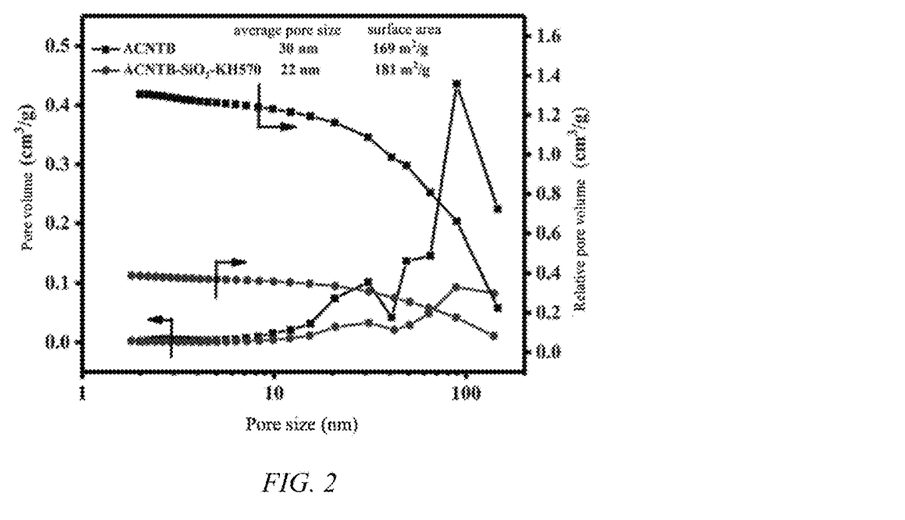
FIG. 2 shows the pore size distribution and particle surface area (obtained by a specific surface area and porosity analyzer) of ACNTB and ACNTB-$SiO_2$-KH570 of Example 1.

FIG. 1 shows the scanning electron microscope (SEM) and transmission electron microscope (TEM) images of ACNTB, ACNTB-SiO$_2$-KH570 in Example 1 of the present invention. It can be seen from FIGS. 1a, 1a' and 1c that the CNTs in ACNTB have a certain orientation arrangement, and there are obvious entanglements between the CNTs. In addition, ACNTB has a rich pore structure, but as can be seen from FIG. 1c', after ultrasonic treatment, the structural integrity of ACNTB is obviously damaged, and the CNTs are easily dissociated. From FIGS. 1b, 1b', 1d and 1d', it can be seen that in the ultrasonically treated ACNTB-SiO$_2$-KH570, the surface of the carbon tube is not only adsorbed, the nano-SiO$_2$ particles are also embedded with nano-SiO$_2$ between the carbon tubes and the gaps between the carbon tubes. The overall structure of ACNTB-SiO$_2$-KH570 is complete. It can be seen that the ACNTB-SiO$_2$-KH570 particle structure system constructed by the hybridization of nano-SiO$_2$ and ACNTB is stable, and it is not easy to break the ring under the action of external force. FIG. 2 shows the pore size distribution and particle surface area of ACNTB and ACNTB-SiO$_2$-KH570 in Example 1. It can be seen from FIG. 2 that due to the assembly of SiO$_2$ in the pores of ACNTB, the pores of ACNTB-SiO$_2$-KH570 are significantly reduced and the pores become smaller, but the surface area of ACNTB-SiO$_2$-KH570 is larger than that of ACNTB, which indicates that the interaction area between ACNTB-SiO$_2$-KH570 particles and other components of the coating increases. This is beneficial and improves the interaction between them.

Figure 3:
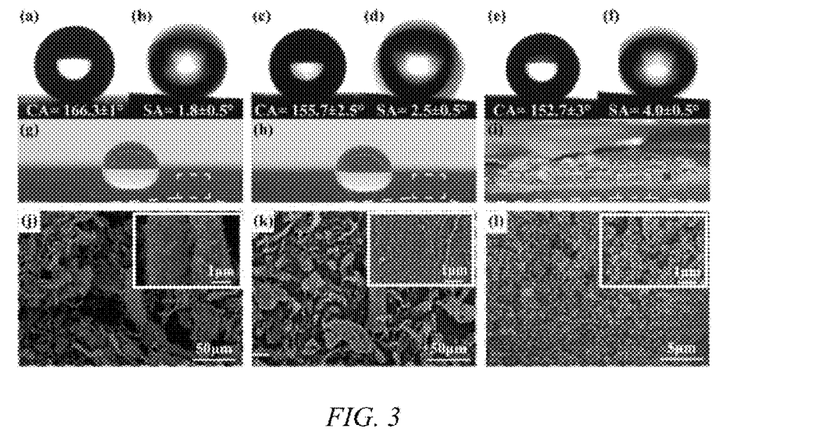
FIG. 3 shows the digital photos of the water contact angle CA, the sliding angle SA of the coating, water droplets on the coating surface and SEM images of the coating, ACNTB-$SiO_2$-KH570 (a, b, g, j), ACNTB (c, d, h, k), $SiO_2$-KH570 (e, f, i, l).

In order to evaluate the super-hydrophobicity of ACNTB-SiO$_2$-KH570 particles, ACNTB-SiO$_2$-KH570 particles and toluene were mixed to prepare into an ACNTB-SiO$_2$-KH570 solution with a weight ratio of 1:9, and the solution was drop-coated on the surface of a glass substrate. A dense layer of ACNTB-SiO$_2$-KH570 particles was formed on the surface of the glass substrate, and the solvent was evaporated and dried in an oven at 60° C. for 1 h to obtain an ACNTB-SiO$_2$-KH570 coating. ACNTB and SiO$_2$-KH570 particles were drop-coated on a glass substrate surface to obtain ACNTB and SiO$_2$-KH570 coatings as a comparative sample. FIG. 3 shows the water contact angle (CA), sliding angle (SA), digital photos and SEM photos of ACNTB-SiO$_2$-KH570, ACNTB and SiO$_2$-KH570 coatings. The CA and SA values of ACNTB coatings are 155.7±2.5° and 2.5±0.5°, respectively. The CA and SA values of the SiO$_2$-KH570 coating are 152.7±3° and 4±0.5°, respectively. The CA and SA values of the ACNTB-SiO$_2$-KH570 coating are 166.3±1° and 1.8±0.5°, respectively. Obviously, the ACNTB-SiO$_2$-KH570 coatings have higher CA and lower SA values than the ACNTB and SiO$_2$-KH570 coatings, indicating that the ACNTB-SiO$_2$-KH570 coatings have good superhydrophobic properties. For superhydrophobic surfaces, air pockets between droplets and solids can form a stable liquid-gas-solid interface, and solid surfaces with complex hierarchical structures can increase the gas fraction on the surface and provide more stable air pockets, giving materials better hydrophobicity. The SEM image of ACNTB-SiO$_2$-KH570 (FIG. 1) shows that ACNTB-SiO$_2$-KH570 particles are composed of ACNTB and SiO$_2$-KH570 particles, which have a complex hierarchical nanostructured surface, so they can have excellent super-hydrophobicity. Under stirring conditions, a mixed solution of 9.35 g of TEOS and 40 g of ethanol was added dropwise to the mixed solution of 9.1 g of ammonia water and 110 g of ethanol, heated in a water bath at 60° C., and 2.5 g of KH570 was added after stirring for 18 h. After the reaction was completed, it was naturally cooled to room temperature, and the obtained suspension was washed with ethanol and centrifuged three times to collect the particles, and then dried in a vacuum oven at 60° C. for 12 h to obtain nano-SiO$_2$-KH570 particles.

Figure 4:
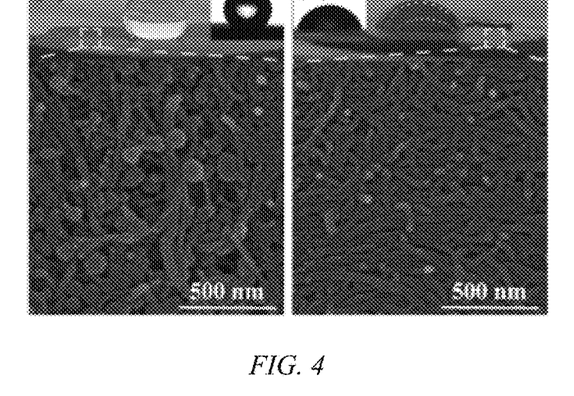
FIG. 4 shows the digital photos of ACNTB-$SiO_2$-KH570 and ACNTB after tableting ACNTB-$SiO_2$-KH570 (a) and ACNTB (b) coatings with water droplets on the coating surface and the SEM images of the coatings.

FIG. 4 shows a digital photo of the ACNTB-SiO$_2$-KH570 and ACNTB flakes obtained by conventional compression of the ACNTB-SiO$_2$-KH570 and ACNTB coatings by a press, the water droplets on the coating surface and the SEM photo after pressing. The CAs of water in ACNTB-SiO$_2$-KH570 and ACNTB flakes are 147.4±2.5° and 71.7±2.5°, respectively. Apparently, the pressed ACNTB-SiO$_2$-KH570 flakes are still hydrophobic. It can be seen from the SEM image (FIG. 4a) that the compressed ACNTB-SiO$_2$-KH570 sheet still has many pore structures; while the pores between the CNTs between the compressed ACNTBs are significantly reduced. Since the existence of SiO$_2$ particles between CNTs in ACNTB-SiO$_2$-KH570 can maintain the spacing between CNTs and limit the displacement of CNTs, the original structure can be relatively well maintained, which indicates the structural stability of the ACNTB-SiO$_2$-KH570 coating is good.

At 30° C., 2 g epoxy resin (E-51), 0.02 g ACNTB-SiO$_2$-KH570, 0.6 g DGETPDMS (colorless transparent liquid, viscosity (25° C.) 5000 mPa·s, density (25° C.) 1.08), and 0.88 g HBPSi were mixed evenly and maintained for 10 min to obtain a resin adhesive prepolymer, and then the adhesive prepolymer was uniformly applied on the surface of the aluminum plate substrate (the thickness of the adhesive prepolymer layer was 70 μm), and the prepolymer formed a gel after 15 min. A toluene suspension containing ACNTB-$SiO_2$-KH570 (ACNTB-$SiO_2$-KH570, toluene being 0.086 g, 4.3 g, respectively) was drop-coated on the surface of the resin prepolymer, and placed for 30 minutes. A wear-resistant superhydrophobic composite with a wear-resistant superhydrophobic E-51/ACNTB-$SiO_2$-KH570 composite coating with a micro/nanostructured surface was obtained by curing at 60° C./1 h+100° C./1 h, and the coating thickness was 100 μm.

In order to compare with the examples and reflect the unexpected technical effect of the present invention, the following comparative example 1-1, comparative example 1-2, comparative example 1-3 used the same substrates.

Comparative Example 1-1 at 30° C., 2 g epoxy resin (E-51), 0.6 g DGETPDMS (colorless and transparent liquid, viscosity (25° C.) 5000 mPa·s, density (25° C.) 1.08) and 0.88 g HBPSi was mixed evenly. After maintaining for 10 minutes, the resin adhesive prepolymer was obtained, and then the adhesive prepolymer was uniformly applied on the surface of an aluminum substrate. When the prepolymer formed a gel, it was cured at 60° C./1 h+100° C./1 h to obtain E-51 coating with a thickness of 100 μm.

Comparative Example 1-2 at 30° C., 2 g epoxy resin (E-51), 0.02 g ACNTB-$SiO_2$-KH570, 0.6 g DGETPDMS (colorless transparent liquid, viscosity (25° C.) is 5000 mPa·s, density (25° C.) is 1.08) and 0.88 g HBPSi were mixed evenly, and maintained for 10 min to obtain a resin adhesive prepolymer. The mixture was mixed with toluene to form an ACNTB-$SiO_2$-KH570 toluene suspension (ACNTB-$SiO_2$-KH570:toluene=0.086 g:4.3 g), and then applied on the surface of an aluminum substrate. When the prepolymer formed a gel, the E-51/ACNTB-$SiO_2$-KH570-blend coating was obtained by curing at 60° C./1 h+100° C./1 h, and the coating thickness was 100 μm.

Figure 5:
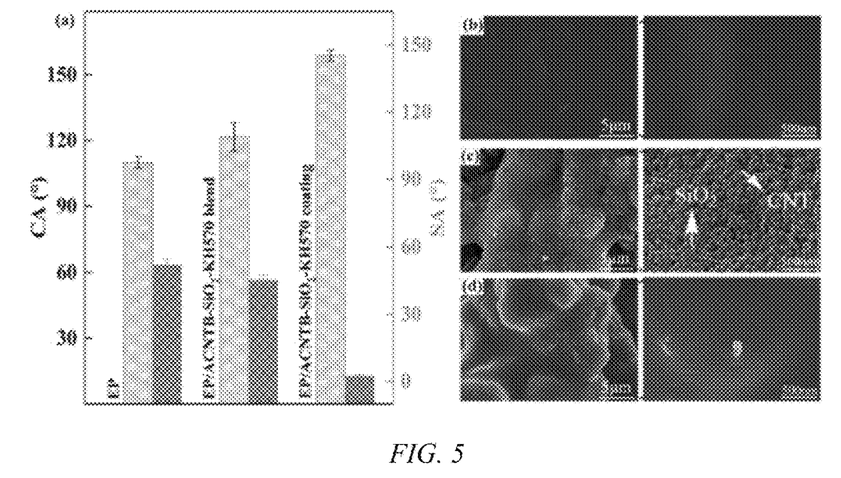
FIG. 5 shows the super-hydrophobic E-51/ACNTB-$SiO_2$-KH570 composite coating prepared in Example 1, the water contact angle CA and sliding angle SA (a) of the E-51 coating in Example 1-1 and in Comparative Example 1-2, the SEM images of coatings in Example 1-1(b), Example 1(c) and Example 1-2(d).

FIG. 5 shows the water contact angle CA and sliding angle SA values and SEM images of superhydrophobic E-51/ACNTB-$SiO_2$-KH570 composite prepared in Example 1, the E-51 coating of comparative example 1-1, and the E-51/ACNTB-$SiO_2$-KH570-blend coating of comparative example 1-2. The CA and SA of the coating in Example 1 are: 159° and 2.5°, respectively. It can be seen that, compared with the coatings of comparative examples 1-1 and 1-2, the E-51/ACNTB-$SiO_2$-KH570 composite coating in Example 1 has excellent super-hydrophobicity. It can be seen from the SEM photo of FIG. 5c that the E-51/ACNTB-$SiO_2$-KH570 composite coating has micron protrusions, and the existence of nano-CNT and $SiO_2$ particles can be clearly observed on the surface of the coating. The E-51/ACNTB-$SiO_2$ micro/nano-structured surface of the KH570 composite coating is beneficial to adsorb a large number of air molecules, reduce the contact between water droplets and the coating surface, and make the coating exhibit excellent super-hydrophobicity, while comparative examples 1-1 and comparative examples 1-2 coatings have low CA and high SA values.

Figure 6:
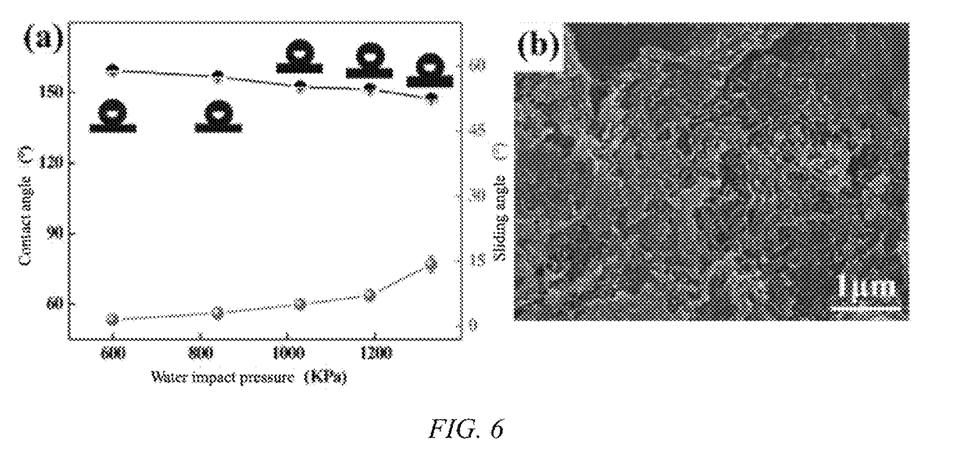
FIG. 6 shows the CA and SA (a) of the super-hydrophobic E-51/ACNTB-$SiO_2$-KH570 composite coating prepared in Example 1 after being impacted by different water flows for 120 s, water pressure was 1329 KPa, and the SEM photo of the surface of the coating (b).

FIG. 6 shows the SEM images of the superhydrophobic E-51/ACNTB-$SiO_2$-KH570 composite coating prepared in example 1 after different water flow impact (120 s) and the surface SEM images of the coating after water pressure 1329 KPa impact. It can be found from FIG. 6a that although the CA of the EP/ACNTB-$SiO_2$-KH570 coating decreases slightly and the SA value gradually increases after being impacted by different water pressures, the EP/ACNTB-$SiO_2$-KH570 coating gradually increases after being washed by a water pressure of 1188 KPa for 120 s, the CA value of the coating is 151.4±1.5°, and the SA value remains at 7.1±1.5°. After the coating is impacted by water pressure of 1329 KPa, the CA decreases to 147.7±1.5°, and the SA increases from 2.5±0.5° to 14.3±3°. At this time, the superhydrophobicity of the coating starts to disappear, but it still has high hydrophobicity. It can be seen from FIG. 6b that after the pressure of 1329 KPa, the exposed CNTs can be clearly observed on the surface of the coating, and a large number of exposed particles can easily and effectively ensure the hydrophobicity of the coating.

Figure 7:
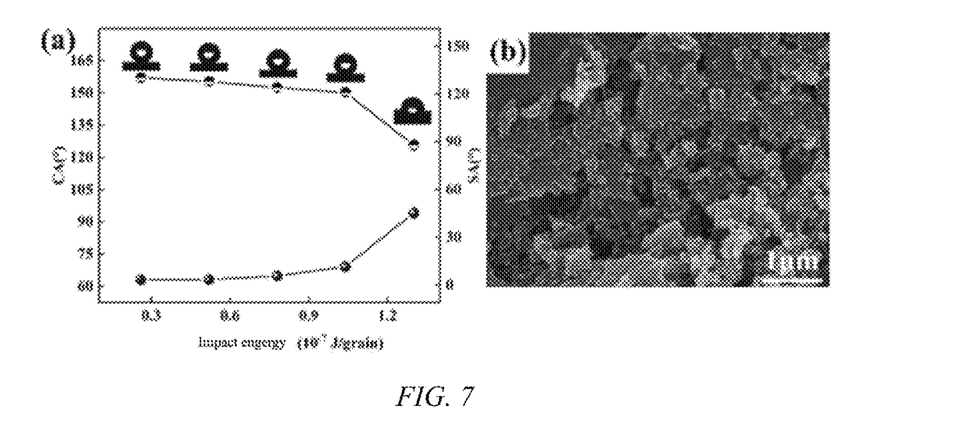
FIG. 7 shows the composite coatings CA and SA (a) of the super-hydrophobic E-51/ACNTB-$SiO_2$-KH570 composite coating prepared in Example 1 after being subjected to different impact energies of sand particles (250 g, with an average particle size of 251 μm), the SEM images (b) of the coating surface after being subject to sand particles of impact energy of $1.04 \times 10^{-7}$ J/grain.

FIG. 7 shows the superhydrophobic E-51/ACNTB-$SiO_2$-KH570 composite coating prepared in example 1 after being subjected to different impact energies of sand particles (average particle size of 251 μm) and the CA and SA of the composite coatings after $1.04\times10^{-7}$ J/SEM photo of the coating surface after the energy impact of the grain. As the impact energy of quartz sand increases, the CA and SA values of the composite coatings after impact slowly decrease and increase, respectively. When the impact energy is $1.04\times10^{-7}$ J/grain, the CA of the coating is 151.3±1.6°, and the SA is 11.5±1.9°, indicating that the coating also exhibits good impact resistance to sand impact. After being impacted by $1.04\times10^{-7}$ J/grain sand particles, the damaged area of the composite coating can still maintain a good rough surface structure, and protruding nanoparticles can be observed on the surface, which plays an important role in the maintenance of super-hydrophobicity. When the impact energy reaches $1.3\times10^{-7}$ J/grain, the CA and SA of the coating are 125.7±2° and 45.2±2.9°, respectively, and the superhydrophobic property is lost.

The water impact test (FIG. 6) and the falling sand test (FIG. 7) show that the composite coating in example 1 has excellent impact resistance with excellent strength and toughness, and strong interactions between particles may be effective is resisting external forces. It has played a positive role in prolonging the service life of the coating.

Figure 8:
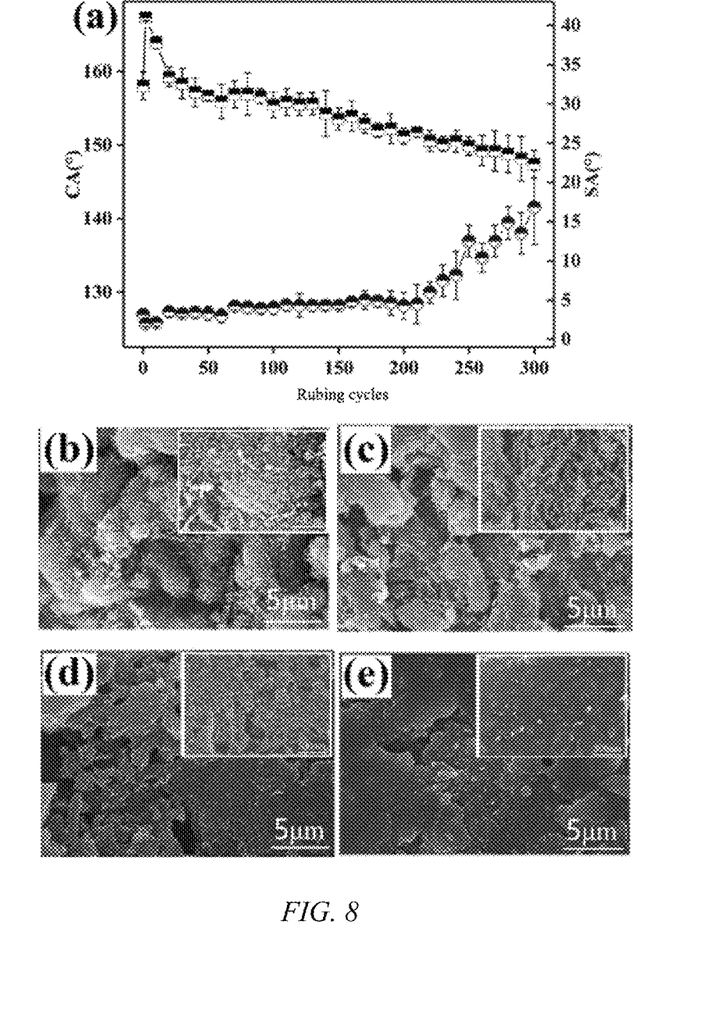
FIG. 8 shows the CA and SA (a) of the super-hydrophobic E-51/ACNTB-$SiO_2$-KH570 composite material coating prepared in Example 1 after grinding with 800-mesh sandpaper under 100 g load and the SEM images of the coating after coating friction rubbing cycles 2 (b), 60 (c), 260 (d) and 300(e).

FIG. 8 shows the change of CA and SA of the superhydrophobic E-51/ACNTB-$SiO_2$-KH570 composite coating prepared in example 1 after grinding with 800-grit sandpaper under a load of 100 g and the SEM photograph of the coating surface. It can be seen from the figure that when the coating undergoes two friction (rubbing) cycles, the CA of the coating increases and the SA slightly decreases; it can be seen from FIG. 8b that there are obviously noticeable CNTs on the surface of the coating, and this surface structure can make the adsorption of air molecules on the coating surface increases, reduce the contact of water droplets with the coating surface. Particularly, when the rubbing cycles reach 260 times, the CA and SA of the coating remain above 150° and below 10°, indicating that the coating is still superhydrophobic and the coating surface is still rich in nanoparticles at this time. The E-51/ACNTB-$SiO_2$-KH570 composite material coating of the present invention can withstand nearly 300 sandpaper grinding cycles (the friction stroke of the coating on the surface of the sandpaper is nearly 30 m), indicating that the coating has excellent wear resistance, mainly due to the fact that the coating has excellent mechanical properties and has a large force with the adhesive layer, which makes the coating can effectively resist external force wear.

Compared with the superhydrophobic coatings reported in the existing literature, the superhydrophobic E-51/ACNTB-SiO$_2$-KH570 composite coating prepared in example 1 has the following advantages: (1) it does not contain fluorine, and the coating is green and environmentally friendly; (3) the superhydrophobic coating has both high impact resistance and friction performance. Among the coatings reported in the literature, no water impact pressure reaches 1188K Pa, and no sand impact energy reaches 1.04×10$^{-7}$ J/grain. There are no literatures reporting that coatings have superhydrophobicity and high impact performance at the same time and maintain superhydrophobic properties after nearly 300 sandpaper grinding cycles.

Figure 9:
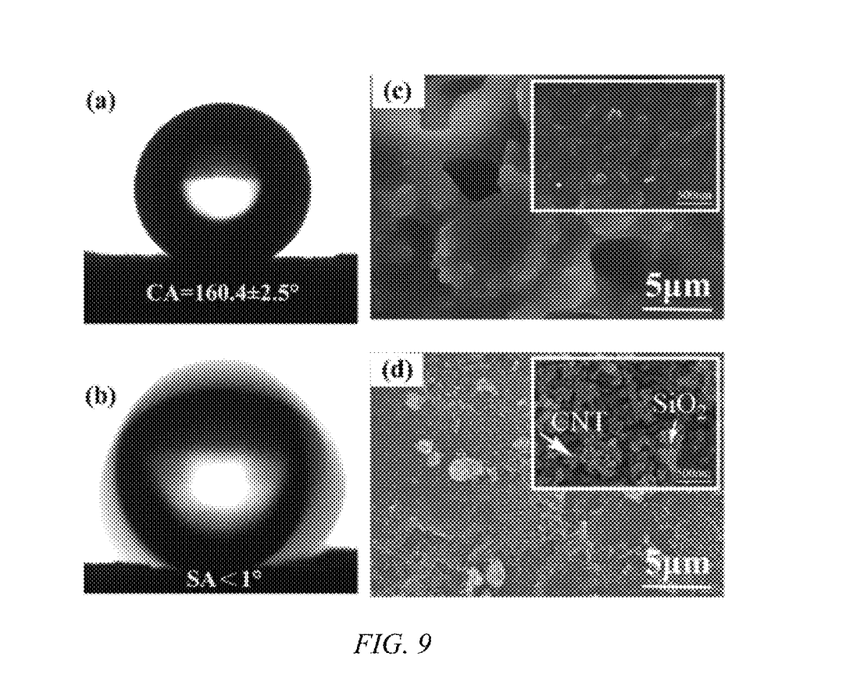
FIG. 9 shows the water contact angle photo and SEM image of the superhydrophobic E-51/ACNTB-$SiO_2$-KH570 composite prepared in Example 1 after the coating is damaged and the tape is peeled off and after being placed in a 300° C. muffle furnace for 9 h, where a, b, and d correspond to the heated coating after damage stripping; c corresponds to the unheated coating after damage stripping.

The superhydrophobic E-51/ACNTB-SiO$_2$-KH570 composite coating prepared in example 1 was polished with 800-grit sandpaper under a load of 100 g for 300 times and then peeled off with 3M tape (removing the surface particle floating layer) to obtain a damaged coating. It was placed in a muffle furnace at 300° C. for 9 h, and the water contact angle photos and SEM photos of the coating surface before and after heating were tested, as shown in FIG. 9. The coating of E-51/ACNTB-SiO$_2$-KH570 composite was damaged and the coating lost its hydrophobicity after being peeled off. After heating at 300° C. for 9 h, the CA of the coating changed from 123° to 160.4±2.5°, and the SA was less than 1°. It can be seen from the SEM photos that after the damaged coating was heated at 300° C., nanoparticles ere aggregated on the surface of the coating. This structure is beneficial to the recovery of the superhydrophobic property of the coating.

Comparative Example 1-3 at 30° C., 2 g epoxy resin (E-51), 0.02 g ACNTB-SiO$_2$-KH570, 0.6 g DGETPDMS (colorless transparent liquid, viscosity (25° C.) is 5000 mPa·s, density (25° C.) is 1.08), 0.88 g of 3-aminopropyltriethoxysilane (KH550) were mixed evenly, and maintained for 10 min to obtain a resin adhesive prepolymer, and then the adhesive prepolymer was uniformly applied on the surface of an aluminum substrate, and prepolymerized after 15 min. When the polymer reached a gel state, a toluene suspension containing ACNTB-SiO$_2$-KH570 (ACNTB-SiO$_2$-KH570 and toluene being 0.086 g and 4.3 g, respectively) was drop-coated on the surface of the resin prepolymer, after standing for 30 minutes, 60° C./1 h+100° C./1 h curing treatment to obtain E-51/KH550/ACNTB-SiO$_2$-KH570 composite coating with micro/nano structure surface. After water pressure 1188 KPa/120 s, sand impact energy 1.04×10$^{-7}$ J/grain, or 50 sandpaper rubbing cycles, super-hydrophobicity was lost (CA<130°, SA>15°).

In summary, the superhydrophobic epoxy composite coating prepared by using the superhydrophobic ACNTB-SiO$_2$-KH570 particles formed by the hybridization of multi-level nanoparticles with stable structure has excellent durability.

Example 2

Under stirring conditions, 1.0 g of ACNTB particles were added to a mixed solution of 9.1 g of ammonia water and 110 g of ethanol. After stirring for 10 min, a mixed solution of 9.35 g of TEOS and 40 g of ethanol was added dropwise, heated in a water bath at 60° C., stirred at a constant speed for 18 h, and then added with 2.5 g of KH570. After continuing to stir for 6 h, the reaction was completed, naturally cooled to room temperature, the obtained suspension was washed with ethanol and centrifuged three times to collect ACNTB-SiO$_2$-KH570 particles, and then dried in a vacuum oven at 60° C. for 12 h to obtain black ACNTB-SiO$_2$-KH570 particles.

At 30° C., 2 g epoxy resin (E-51), 0.02 g ACNTB-SiO$_2$-KH570, 0.6 g DGETPDMS (colorless transparent liquid, viscosity (25° C.) 5000 mPa·s, density (25° C.) 1.08), 0.88 g HBPSi were mixed evenly, and maintained for 10 minutes to obtain a resin adhesive prepolymer, and then the adhesive prepolymer was uniformly scraped on the surface of an aluminum plate substrate (the thickness of the adhesive prepolymer coating was 70 μm). After 15 minutes, the prepolymer reached a gel state, an ACNTB-SiO$_2$-KH570-toluene suspension (ACNTB-SiO$_2$-KH570:toluene=0.114 g:5.7 g) was coated on the surface of the resin prepolymer. A wear-resistant superhydrophobic composite with a wear-resistant superhydrophobic E-51/ACNTB-SiO$_2$-KH570 composite coating with a micro/nanostructured surface was obtained by curing at 60° C./1 h+100° C./1 h, and the coating thickness was 100 μm.

Comparative Ratio 2-1 at 30° C., 2 g epoxy resin (E-51), 0.02 g ACNTB-SiO$_2$-KH570, 0.6 g DGETPDMS (colorless transparent liquid, viscosity (25° C.) is 5000 mPa·s, density (25° C.) is 1.08) and 0.88 g HBPSi were mixed evenly and maintained for 10 min to obtain a resin adhesive prepolymer, which was blended with an ACNTB-SiO$_2$-KH570 suspension (ACNTB-SiO$_2$-KH570:solvent=0.4 g:18 g), and then applied on a substrate. E-51/ACNTB-SiO$_2$-KH570-blend coating was obtained by curing treatment at 60° C./1 h+100° C./1 h, and the coating thickness was 100 μm.

Figure 10:
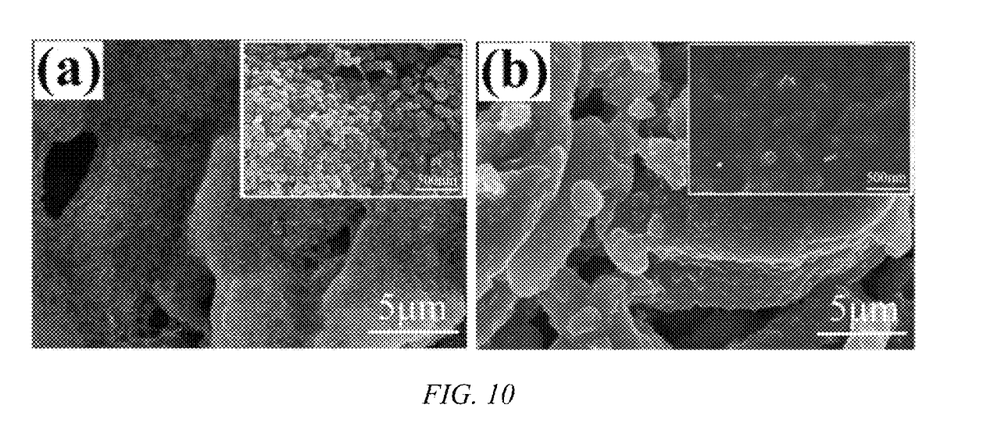
FIG. 10 shows the SEM images of the coatings in Example 2 and Comparative Example 2.

FIG. 10 shows the SEM photos of the coatings in example 2 and comparative example 2-1, and Table 1 shows the performance data of the coatings in example 2 and comparative example 2-1; the test method was the same as that in example 1. As can be seen from FIG. 10 and Table 1, the present invention uses a small amount of ACNTB-SiO$_2$-KH570 particles to obtain super-hydrophobicity for the coating, and the coating surface has a micro/nanostructured surface. The blending technology needs to add a large amount of ACNTB-SiO$_2$-KH570 particles to obtain a higher CA of the coating, but the SA is significantly greater than 10°, and the coating does not have superhydrophobicity. It can be seen from Table 1 that the coating in example 2 has super-hydrophobicity after being subjected to water pressure of 1188 KPa, sand impact energy of 1.04×10$^{-7}$ J/grain and 250 sandpaper rubbing cycles, and the superhydrophobicity of the coating, after being damaged, can be restored by heating at 300° C. for 9 h.

TABLE 1

Properties of the coatings of example 2 and comparative example 2-1

| Coating property | Example 2 | Comparative Example 2-1 |
|---|---|---|
| Contact angle (CA)/° | 159 | 145 |
| Sliding angle (SA)/° | 2.0 | 18 |
| CA/SA after water pressure (1188 Kpa) impact for 120 s | 150°/7° | / |
| CA/SA after sand impact (energy: 1.04 × 10$^{-7}$ J/grain) | 153°/9° | / |
| CA/SA after 250 sandpaper rubbing cycles | 150°/10° | / |
| Damaged coating heated at 300° C. for 9 h | 161°/3° | / |

Comparative Example 2-2 under stirring conditions, a mixed solution of 9.35 g of TEOS and 40 g of ethanol was added dropwise to a mixed solution of 9.1 g of ammonia water and 110 g of ethanol, heated in a water bath at 60° C., stirred at a constant speed for 18 h, added 2.5 g of KH570, and continued to stir for 6 h. After the reaction was completed, the mixture was naturally cooled to room temperature, and the obtained suspension was washed with ethanol and centrifuged three times to collect particles, and then dried in a vacuum oven at 60° C. for 12 h to obtain $SiO_2$-KH570 particles.

At 30° C., 2 g epoxy resin (E-51), 0.02 g $SiO_2$-KH570, 0.6 g DGETPDMS (colorless transparent liquid, viscosity (25° C.) 5000 mPa·s, density (25° C.) 1.08), and 0.88 g HBPSi were evenly mixed and maintained for 10 minutes to obtain a resin adhesive prepolymer, and then the adhesive prepolymer was uniformly applied on the surface of an aluminum plate substrate (the thickness of the adhesive prepolymer layer was 70 μm). After 15 minutes, when the prepolymer reached a gel state, and a $SiO_2$-KH570-toluene suspension ($SiO_2$-KH570:toluene=0.114 g: 5.7 g) was then drop-coated on the surface of the resin prepolymer, placed for 30 minutes, and then cured at 60° C./1 h+100° C./1 h to obtain E-51/$SiO_2$-KH570 composite coating (coating thickness was 100 μm), which had no superhydrophobicity after water pressure 1188 KPa/120 s, sand impact energy $1.04 \times 10^{-7}$ J/grain, and 80 sandpaper rubbing cycles (CA<130°, SA>15°).

Comparative Example 2-3 under stirring conditions, 0.2 g of KH570 was added dropwise to a mixed solution of 10 g of ACNTB particles and 100 g of ethanol at 60° C. After stirring for 6 hours, the reaction was completed, and the suspension was naturally cooled to room temperature. The obtained suspension was washed with ethanol and centrifuged three times. Particles were collected and then dried in a vacuum oven at 60° C. for 12 h to obtain ACNTB-KH570 particles.

At 30° C., 2 g epoxy resin (E-51), 0.02 g ACNTB-KH570, 0.6 g DGETPDMS (colorless transparent liquid, viscosity (25° C.) 5000 mPa·s, density (25° C.) 1.08), 0.88 g HBPSi were mixed uniformly and maintain for 10 minutes to obtain a resin adhesive prepolymer, and then the adhesive prepolymer was uniformly applied on the surface of an aluminum plate substrate (the thickness of the adhesive prepolymer layer as 70 μm). After 15 minutes, when the prepolymer reached a gel state, the ACNTB-KH570-toluene suspension (ACNTB-KH570:toluene=0.114 g:5.7 g) was coated on the surface of the resin prepolymer, placed for 30 minutes, and cured at 60° C./1 h+100° C./1 h. The obtained E-51/ACNTB-KH570 composite coating (coating thickness was 100 μm) had no superhydrophobicity after being subjected to water pressure of 1188 KPa/120 s, sand impact energy of $1.04 \times 10^{-7}$ J/grain and 30 sandpaper rubbing cycles. (CA<110°, SA>35°).

In summary, the superhydrophobic epoxy composite coating prepared by using the superhydrophobic ACNTB-$SiO_2$-KH570 particles formed by the hybridization of multi-level nanoparticles with stable structure has excellent durability.

Example 3 under stirring conditions, 2.0 g of ACNTB particles were added to a mixed solution of 12 g of ammonia water and 150 g of ethanol. After stirring for 10 min, a mixed solution of 14 g of TEOS and 50 g of ethanol was added dropwise, heated in a water bath at 60° C., and 5 g of vinyltriethoxysilane (VTES) was added after stirring for 36 h. After stirring for 6 h, the reaction was completed, and the reaction mixture was naturally cooled to room temperature. The obtained suspension was washed with ethanol and centrifuged three times to collect ACNTB-$SiO_2$-VTES particles, and then placed in a vacuum oven at 60° C. After drying for 12 h, black ACNTB-$SiO_2$-VTES particles were obtained.

At 80° C., 2 g epoxy resin (E-44) and 0.6 g HBPSi were mixed uniformly and maintained for 20 min to obtain a resin adhesive prepolymer, and then the adhesive prepolymer was uniformly applied on the surface of an aluminum plate substrate (adhesive prepolymer layer thickness was 70 μm). When the prepolymer reached a gel state, an ACNTB-$SiO_2$-VTES-toluene suspension (ACNTB-$SiO_2$-VTES:toluene=0.08 g: 2 g) prepared in advance was gradually coated on the surface of the resin prepolymer. After the solvent volatilized, the coating was cured at 50° C./1 h+80° C./2 h to obtain a wear-resistant superhydrophobic E-44/ACNTB-$SiO_2$-VTES composite coating with a micro/nanostructured surface. The superhydrophobic composite had a coating thickness of 100 μm.

Comparative Ratio 3-1 at 80° C., 2 g epoxy resin (E-44) and 0.6 g HBPSi were mixed evenly, and maintained for 20 min to obtain a resin adhesive prepolymer, which was mixed with an ACNTB-$SiO_2$-VTES suspension (ACNTB-$SiO_2$-VTES:solvent=0.08 g:2 g) after blending, then coating on the surface of the substrate and curing treatment at 50° C./1 h+80° C./2 h to obtain E-44/ACNTB-$SiO_2$-VTES-blend coating with a coating thickness of 100 μm.

Table 2 shows the performance data of the coatings of example 3 and comparative example 3. As shown in Table 2, when using the same small amount of ACNTB-$SiO_2$-VTES particles, the composite coating prepared according to the present invention can obtain excellent superhydrophobicity, while the CA of the coating obtained by the blending technology is less than 150° and the SA is significantly greater than 10°, and the coating does not possess superhydrophobicity. It can be seen from Table 2 that the coating in example 3 has superhydrophobicity after being subjected to a water pressure of 1188 KPa/120 s, a sand impact energy of $1.04 \times 10^{-7}$ J/grain and 300 sandpaper rubbing cycles. The superhydrophobicity was restored by heating at 300° C. for 9 h.

TABLE 2

Properties of the coatings of example 3 and comparative example 3

| Coating property | Example 3 | Comparative Example 3-1 |
|---|---|---|
| Contact angle (CA)/° | 168 | 138 |
| Sliding angle (SA)/° | 1 | 23 |
| CA/SA after water pressure (1188 Kpa) impact for 120 s | 150°/9° | / |
| CA/SA after sand impact (energy: $1.04 \times 10^{-7}$ J/grain) | 151°/8° | / |
| CA/SA after 250 sandpaper rubbing cycles | 153°/9° | / |
| Damaged coating heated at 300° C. for 9 h | 167°/2° | / |

Comparative Example 3-2 under stirring conditions, a mixed solution of 14 g of TEOS and 50 g of ethanol was added dropwise to a mixed solution of 12 g of ammonia water and 150 g of ethanol, heated in a water bath at 60° C., and added 5 g of vinyltriethoxysilane (VTES) after stirring for 36 h. After stirring for 6 h, the reaction was completed, and the reaction mixture was naturally cooled to room temperature. The obtained suspension was washed with ethanol and centrifuged three times to collect $SiO_2$-VTES particles, and then the particles was dried in a vacuum oven at 60° C. for 12 h to obtain $SiO_2$-VTES particles.

At 80° C., 2 g epoxy resin (E-44) and 0.6 g HBPSi were mixed uniformly and maintained for 20 min to obtain a resin adhesive prepolymer, and then the adhesive prepolymer was uniformly applied on the surface of an aluminum plate substrate (adhesive prepolymer layer thickness was 70 μm). When the prepolymer reached a gel state, a pre-prepared $SiO_2$-VTES-toluene suspension ($SiO_2$-VTES:toluene=0.08 g:2 g) was gradually coating on the resin prepolymer. The surface, after the solvent volatilized, was cured at 50° C./1 h+80° C./2 h to obtain the E-44/$SiO_2$-VTES composite coating (coating thickness was 100 μm). After $1.04\times10^{-7}$ J/grain and 70 sandpaper rubbing cycles, the coating did not have superhydrophobicity (CA<140°, SA>10°).

In summary, the superhydrophobic epoxy composite coating prepared by using the superhydrophobic ACNTB-$SiO_2$-VTES particles formed by the hybridization of multi-level nanoparticles with stable structure has excellent durability.

Example 4: under stirring conditions, 1.2 g of ACNTB particles were added to a mixed solution of 9 g of ammonia water and 90 g of ethanol. After stirring for 10 min, the mixed solution of 9.0 g of TEOS and 10 g of ethanol was added dropwise, heated in a water bath at 60° C., and 2 g of dodecyltrimethoxysilane (DTMS) was added after stirring at a constant speed for 18 h). After continuously stirring for 6 h, the reaction was completed, and the suspension was naturally cooled to room temperature. The obtained suspension was washed with ethanol and centrifuged three times to collect the ACNTB-$SiO_2$-DTMS particles, and the particles were dried in a vacuum oven at 60° C. for 12 h to obtain black ACNTB-$SiO_2$-DTMS particles.

At 50° C., 1.4 g of phenolic epoxy resin (F51), 1.4 g of DGETPDMS and 1.2 g of HBPSi were mixed uniformly, and a resin adhesive system was obtained after 20 minutes. The adhesive system was uniformly applied on the surface of an aluminum plate substrate (the thickness of the adhesive prepolymer layer was 70 μm). When the system reached a gel state, a prepared ACNTB-$SiO_2$-DTMS-toluene suspension (ACNTB-$SiO_2$-DTMS:toluene=0.4 g:20 g) was gradually coated onto the surface of the resin prepolymer. After the solvent was evaporated, a wear-resistant superhydrophobic composite coated with F51/ACNTB-$SiO_2$-DTMS composite was obtained by curing at 70° C./1 h+150° C./1 h, and the coating thickness was 100 μm.

Comparative Example 4-1 at 50° C., 2 g epoxy resin (F51), 1.4 g DGETPDMS, 1.2 g HBPSi were mixed uniformly, and after 20 minutes, a resin adhesive prepolymer was obtained, which was mixed with an ACNTB-$SiO_2$-DTMS suspension (ACNTB-$SiO_2$-DTMS:solvent=0.4 g:20 g), and then coated on the surface of a substrate. After curing at 70° C./1 h+150° C./1 h, an F51/ACNTB-$SiO_2$-DTMS coating was obtained with a coating thickness of 100 μm.

Table 3 shows the coating performance data of example 4 and comparative example 4-1. As can be seen from Table 3, using the same content of ACNTB-$SiO_2$-DTMS particles, the coating prepared by using the technology of the present invention can obtain excellent superhydrophobicity; while the coating obtained by using the blending technology has a CA lower than 150° and a SA significantly greater than 10°, the coating does not have superhydrophobicity. It can be seen from Table 3 that the coating of Example 4 has superhydrophobicity after being subjected to water pressure of 1188 KPa/120 s, sand impact energy of $1.04\times10^{-7}$ J/grain and 250 sandpaper rubbing cycles. The superhydrophobicity was restored by heating at 320° C. for 5 h.

TABLE 3

Properties of the coatings of example 4 and comparative example 4-1

| Coating property | Example 4 | Comparative Example 4-1 |
|---|---|---|
| Contact angle (CA)/° | 155 | 142 |
| Sliding angle (SA)/° | 5 | 31 |
| CA/SA after water pressure (1188 Kpa) impact for 120 s | 152°/8° | / |
| CA/SA after sand impact (energy: $1.04 \times 10^{-7}$ J/grain) | 153°/9° | / |
| CA/SA after 250 sandpaper rubbing cycles | 150°/10° | / |
| Damaged coating heated at 320° C. for 5 h | 165°/2° | / |

Comparative Example 4-2 under stirring conditions, a mixed solution of 9.0 g of TEOS and 10 g of ethanol was added dropwise to a mixed solution of 9 g of ammonia water and 90 g of ethanol, heated in a water bath at 60° C., stirred at a constant speed for 18 h, and then added 2 g of dodecyltrimethoxysilane (DTMS). After stirring for 6 h, the reaction was completed, and the suspension was naturally cooled to room temperature. The obtained suspension was washed with ethanol and centrifuged three times to collect the particles, and then the particles were dried in a vacuum oven at 60° C. for 12 h to obtain $SiO_2$-DTMS particles.

Under stirring conditions, 10 g of ACNTB particles were added to 90 g of ethanol, and after stirring for 10 min, 0.5 g of dodecyltrimethoxysilane (DTMS) was added under heating in a 60° C. water bath. After continuing to stir for 6 h, the reaction was completed, and the reaction mixture was cooled naturally. After reaching room temperature, the obtained suspension was washed with ethanol and centrifuged three times to collect the particles, and then the particles were dried in a vacuum oven at 60° C. for 12 h to obtain ACNTB-DTMS particles.

At 50° C., 1.4 g of phenolic epoxy resin (F51), 1.4 g of DGETPDMS and 1.2 g of HBPSi were mixed uniformly, and a resin adhesive system was obtained after 20 minutes. The adhesive system was uniformly applied on the surface of an aluminum plate substrate (the thickness of the adhesive prepolymer layer was 70 μm). When the system reached a gel state, an ACNTB-DTMS/$SiO_2$-DTMS/toluene suspension prepared in advance (the weights of ACNTB-DTMS, $SiO_2$-DTMS, and toluene being 0.2 g, 0.2 g, 20 g, respectively) was gradually drop-coated on the surface of the resin prepolymer. After the solvent evaporated, a composite coating was obtained by curing at 70° C./1 h+150° C./1 h. The thickness of the coating was 100 μm. After $1.04\times10^{-7}$ J/grain sand treatment and 20 sandpaper rubbing cycles, the coating did not have any superhydrophobicity (CA<130°, SA>20°).

To sum up the above analysis, the superhydrophobic epoxy composite coating prepared by using ACNTB-$SiO_2$-

DTMS particles formed by multi-level nanoparticle hybridization has excellent durability.

The invention claimed is:

1. A wear-resistant super-hydrophobic composite material, comprising
a substrate, and
a wear-resistant super-hydrophobic composite coating on a surface of the substrate;
wherein
the wear-resistant super-hydrophobic composite coating is prepared by curing a super-hydrophobic composite precursor;
the superhydrophobic composite precursor comprises a gel and an aligned carbon nanotube bundles-$SiO_2$-coupling (ACNTB-$SiO_2$-coupling) agent layer on a surface of the gel;
the gel comprises an epoxy resin, an amino-terminated hyperbranched polysiloxane, and an additive;
the additive is an ACNTB-$SiO_2$-coupling agent, the ACNTB-$SiO_2$-coupling agent is prepared by mixing and reacting aligned carbon nanotube bundles (ACNTB), an alkali, a solvent, and tetraethyl orthosilicate and then adding a silane coupling agent and continuing reacting; and
the ACNTB-$SiO_2$-coupling agent layer is a suspension that comprises the ACNTB-$SiO_2$-coupling agent and is coated on the gel.

2. The wear-resistant super-hydrophobic composite material according to claim 1, wherein a weight ratio of the aligned carbon nanotube bundles, tetraethyl orthosilicate, the silane coupling agent, the alkali, and the solvent is (1-2): (9-14): (2-5): (9-12): (100-200).

3. The wear-resistant super-hydrophobic composite material according to claim 1, wherein the aligned carbon nanotube bundles have a diameter of 10-25 μm and a length of 30-100 μm; the silane coupling agent is γ-methacryloyloxy propyltrimethoxysilane, hexamethylsilazane, dodecyltrimethoxysilane, vinyltrimethoxysilane, phenyltrimethoxysilane or hexadecyltrimethoxysilane; the alkali is ammonia or triethanolamine; the solvent is water, ethanol, ethyl acetate or a mixture thereof.

4. The wear-resistant super-hydrophobic composite material according to claim 1, wherein in the super-hydrophobic composite material precursor, a weight of the ACNTB-$SiO_2$-coupling agent, the epoxy resin, the diglycidyl ether-terminated polymer dimethylsiloxane and the amino-terminated hyperbranched polysiloxane is 4.0-20 parts, 70-100 parts, 0-70 parts, and 30-60 parts, respectively.

5. The wear-resistant super-hydrophobic composite material according to claim 1, wherein the epoxy resin is one or more selected from the group consisting of bisphenol A epoxy resin, bisphenol F type epoxy resin, bisphenol S type epoxy resin, hydrogenated bisphenol A peroxide resin, phenolic epoxy resin, multifunctional glycidyl ether resin, glycidyl ester epoxy resin, and halogen epoxy resin; a viscosity of diglycidyl ether end-capped polydimethylsiloxane is 50-10000 mPa·s/25° C., a density is 1.05-1.10/25° C.; an amine value of the amino-terminated hyperbranched polysiloxane is 0.5-0.65 mol/100 g.

6. An application of the wear-resistant super-hydrophobic composite material according to claim 1 in the preparation of a wear-resistant hydrophobic material.

7. The application according to claim 6, wherein the wear-resistant hydrophobic material has super-hydrophobicity and wear resistance.

* * * * *